United States Patent
Victora et al.

(10) Patent No.: US 10,249,335 B2
(45) Date of Patent: Apr. 2, 2019

(54) COMPOSITE HAMR MEDIA STRUCTURE FOR HIGH AREAL DENSITY

(71) Applicant: Seagate Technology LLC, Cupertino, CA (US)

(72) Inventors: Randall Victora, New Brighton, MN (US); Zengyuan Liu, St. Paul, MN (US); Pin-wei Huang, Fremont, CA (US); Ganping Ju, Pleasanton, CA (US); Jan-Ulrich Thiele, Sunnyvale, CA (US)

(73) Assignees: Seagate Technology LLC, Cupertino, CA (US); Regents of the University of Minnesota, Minneapolis, MN (US)

( * ) Notice: Subject to any disclaimer, the term of this patent is extended or adjusted under 35 U.S.C. 154(b) by 27 days.

(21) Appl. No.: 15/713,023

(22) Filed: Sep. 22, 2017

(65) Prior Publication Data
US 2018/0082713 A1   Mar. 22, 2018

Related U.S. Application Data

(60) Provisional application No. 62/398,342, filed on Sep. 22, 2016.

(51) Int. Cl.
| | |
|---|---|
| G11B 5/66 | (2006.01) |
| G11B 17/028 | (2006.01) |
| G11B 5/65 | (2006.01) |
| G11B 5/012 | (2006.01) |
| G11B 5/127 | (2006.01) |
| G11B 5/00 | (2006.01) |

(52) U.S. Cl.
CPC ............... *G11B 5/66* (2013.01); *G11B 5/012* (2013.01); *G11B 5/65* (2013.01); *G11B 17/028* (2013.01); *G11B 5/1278* (2013.01); *G11B 2005/0021* (2013.01); *G11B 2220/23* (2013.01)

(58) Field of Classification Search
None
See application file for complete search history.

(56) References Cited

U.S. PATENT DOCUMENTS

| | | |
|---|---|---|
| 6,881,495 B2 | 4/2005 | Kikitsu et al. |
| 7,201,977 B2 | 4/2007 | Li et al. |
| 7,384,699 B2 | 6/2008 | Nolan et al. |
| 7,678,476 B2 | 3/2010 | Weller et al. |
| 7,782,562 B2 | 8/2010 | Kamata et al. |
| 7,923,136 B2 | 4/2011 | Kimura et al. |
| 8,119,263 B2 | 2/2012 | Nolan et al. |
| 8,168,310 B2 | 5/2012 | Bian et al. |

(Continued)

*Primary Examiner* — Kevin M Bernatz
(74) *Attorney, Agent, or Firm* — Hall Estill Attorneys at Law

(57) ABSTRACT

A heat-assisted magnetic recording media structure with exchange-coupled composite layer structure may be utilized in a data storage device. The heat-assisted magnetic recording disk structure can have a FePt-based layer as a storage layer and a FePt-based or a CoPt-based magnetic layer with higher Curie temperature as a write layer. The interface between the write layer and the storage layer may be separated by an exchange control layer. The composite structure can be optimized to reduce jitter for high density data storage by tuning the exchange coupling between the write layer and storage layer.

20 Claims, 4 Drawing Sheets

(56) References Cited

U.S. PATENT DOCUMENTS

| | | | |
|---|---|---|---|
| 8,460,805 B1 * | 6/2013 | Gao | G11B 5/66 |
| | | | 428/692.1 |
| 8,747,628 B2 | 6/2014 | Bian et al. | |
| 9,224,411 B1 | 12/2015 | Gao et al. | |
| 9,251,831 B2 | 2/2016 | Shi et al. | |
| 9,401,178 B2 | 7/2016 | Sun et al. | |
| 9,564,164 B2 | 2/2017 | Kim et al. | |
| 9,799,363 B2 * | 10/2017 | Chen | G11B 5/716 |
| 9,984,709 B1 * | 5/2018 | Huang | G11B 5/66 |
| 2005/0106422 A1 * | 5/2005 | Lu | G11B 5/65 |
| | | | 428/828.1 |
| 2007/0048552 A1 * | 3/2007 | Soeya | G11B 5/66 |
| | | | 428/828 |
| 2009/0081484 A1 * | 3/2009 | Watanabe | G11B 5/66 |
| | | | 428/828 |
| 2010/0182714 A1 * | 7/2010 | Kanbe | G11B 5/65 |
| | | | 360/59 |
| 2011/0235205 A9 * | 9/2011 | Lu | G11B 5/314 |
| | | | 360/59 |
| 2013/0235491 A1 * | 9/2013 | Mosendz | B82Y 30/00 |
| | | | 360/234.3 |
| 2016/0225394 A1 * | 8/2016 | Moriya | G11B 5/65 |

* cited by examiner

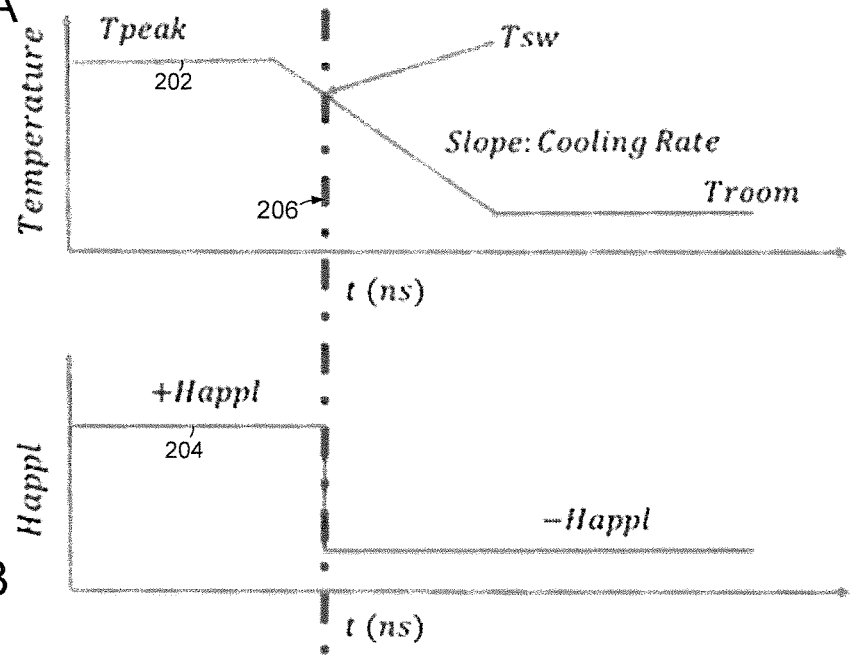
FIG. 6A
FIG. 6B
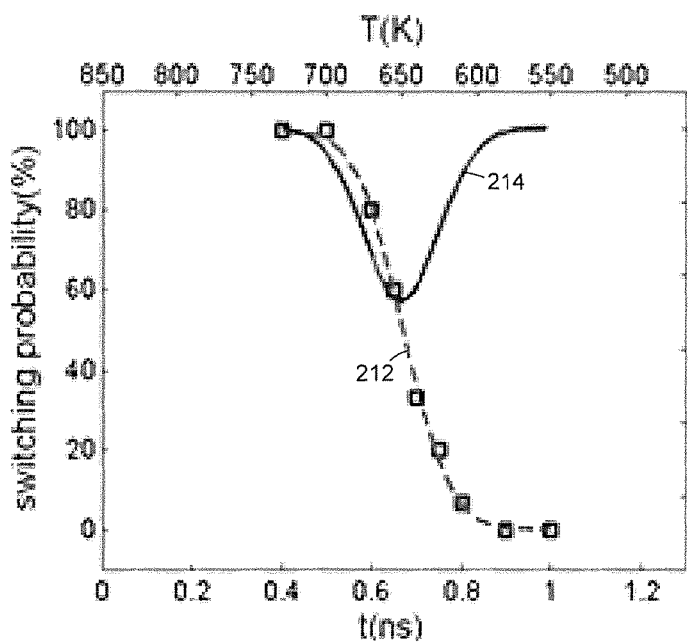
FIG. 7

COMPOSITE HAMR MEDIA STRUCTURE FOR HIGH AREAL DENSITY

RELATED APPLICATION

The present application makes a claim of domestic priority to U.S. Provisional Patent Application No. 62/398,342 filed Sep. 22, 2016, the contents of which are hereby incorporated by reference.

SUMMARY

A data storage device can employ a heat assisted magnetic recording (HAMR) structure with a heating source and tuned media to store data. A HAMR data storage medium, in some embodiments, has an exchange coupled composite (ECC) structure comprising a coupling layer (ECL) contacting and disposed between a storage layer and a write layer with the storage layer having a lower Curie temperature and a higher anisotropy than the respective ECL and write layers. The ECL couples the write layer to the storage layer with a coupling strength that is optimized to reduce transition jitter. The exact value will depend on grain size and other features of the recording system, such as track width.

A heat-assisted magnetic recording (HAMR) data storage medium, in various embodiments, has an exchange coupled composite (ECC) structure consisting of a coupling layer (ECL) contacting and disposed between a storage layer and a write layer. The storage layer constructed of a FePtX-based material and the write layer constructed of a FePtY-based material where X and Y are chosen from the group of C, an oxide, a nitride, and a carbide. The storage layer has a lower Curie temperature and a higher anisotropy than the respective ECL and write layers while the ECL couples the write layer to the storage layer with a coupling strength that corresponds with a transition jitter for the ECC of 2 nm or less.

In other embodiments, a heat assisted magnetic recording (HAMR) data storage medium has a 0.4-0.6 Jex/Jo coupling strength between a storage layer and a write layer. The HAMR storage medium is constructed by depositing a storage layer atop a substrate followed by forming an exchange coupling layer (ECL) in contact with the storage layer. A write layer is deposited to contact the ECL. The storage layer has a lower Curie temperature a higher anisotropy than the respective exchange coupling and write layers. The ECL couples the write layer to the storage layer with the coupling strength of 0.4-0.6 Jex/Jo.

BRIEF DESCRIPTION OF THE DRAWINGS

FIGS. 6A and 6B respectively represent operational data for example HAMR data storage media employed in the device of FIG. 1.

FIG. 7 plots data associated with example HAMR data storage media constructed and operated in accordance with some embodiments.

DETAILED DESCRIPTION

Various embodiments of this disclosure generally relate to the field of hard disk drives (HDD) and specifically to heat-assisted magnetic recording media for HDD.

A heat-assisted magnetic recording (HAMR) media structure with exchange-coupled composite (ECC) layer structure is proposed. The HAMR disk structure may have a FePt-based layer as a storage layer and a FePt-based or a CoPt-based magnetic layer with higher Curie temperature (Tc) as a write layer. The interface between the write layer and the storage layer may be separated by an exchange control layer (ECL). The composite structure can be optimized to reduce jitter and write temperature for high density data storage by tuning the exchange coupling (Jex) between the write layer and storage layer.

Through various embodiments, a HAMR media structure can optimize thermal and magnetic performance to provide reliable data recording at higher temperatures. The use of an ECL tunes the vertical coupling between adjacent magnetic layers to reduce the sensitivity of the Tc distributions of both write layer and storage layers, Tc distribution ranges for the write and storage layer can be 0-5%, typical range of 1-3%. By widening the exchange coupling range between write and storage layers to cover Jex of approximately 5-95% of bulk exchange (Jo), with typical values around 0.2-0.6.

The thickness of the write and storage layer can also be tuned, such as a 1-6 nm or 2-4 nm write layer range and a 3-12 nm or 4-9 nm storage layer range. A HAMR structure can be configured as a lamination of multiple repeats of the write layer, ECL, and storage layer. The materials for storage layers can be FePtX for the storage layer, and FePtY or CoPtZ for the write layer with X, Y, and Z chosen to be a material that produces anisotropy and Curie temperature characteristics that optimize HAMR data writing.

Figure 1:
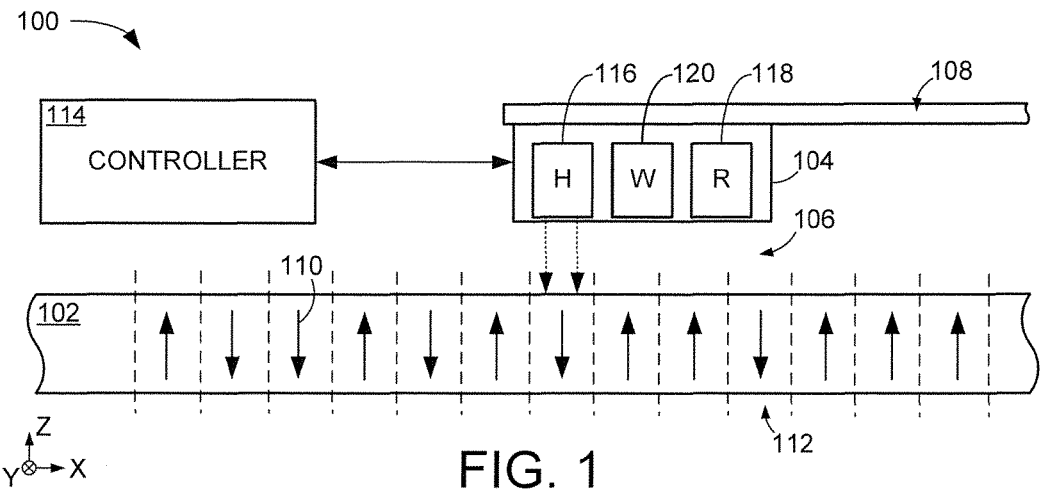
FIG. 1 represents a portion of an example data storage device configured and operated in accordance with some embodiments.

FIG. 1 illustrates a portion of an example data storage device 100 that can employ a HAMR data storage medium 102 in accordance with some embodiments. The device 100 suspends a transducing head 104 on an air bearing 106 above the HAMR medium 102. The medium 102 rotates about a central spindle to allow an actuating assembly 108 to position the transducing head 104 over selected data bits 110 stored on various data tracks 112 on the medium 102.

A local and/or remote controller 114 directs activation of a heating means 116, data reader 118, and data writer 120 to store data to, and retrieve data from the HAMR medium 102. The heating means 116 may be any structure that can quickly heat a localized portion of the HAMR media 102, such as a laser, spin-torque oscillator, frequency generator, or conductive wire, as represented by arrows 122. The temporary heating of the HAMR media 102 allows the data writer 120 to quickly and accurately program one or more data bits 110. However, in an effort to increase data store capacity, the density of data bits 110 is increased on the HAMR medium 102, which emphasizes the heat and magnetic resolution and speed of the heating means 116, medium 102, and data writer 120.

Figure 2:
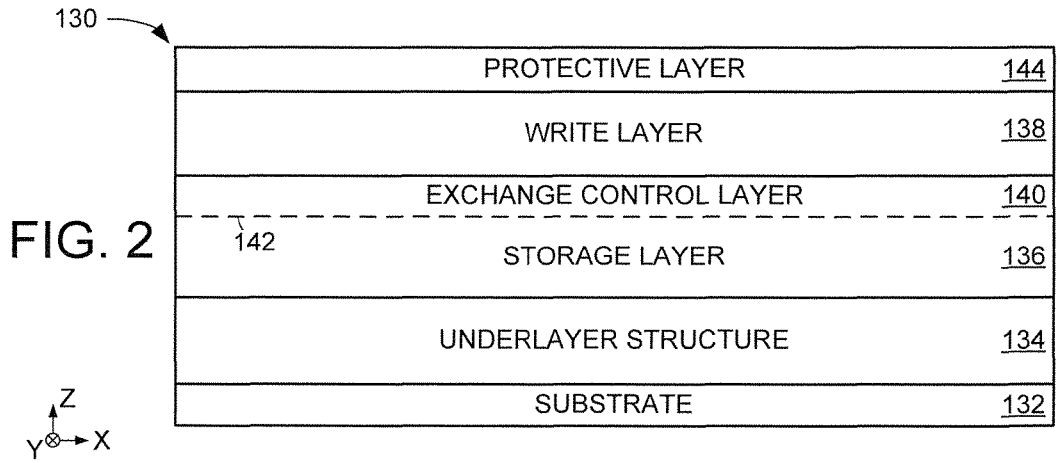
FIG. 2 shows a cross-sectional block representation of a portion of an example HAMR data storage medium capable of being used in the device of FIG. 1.

FIG. 2 is a cross-sectional block representation of a portion of an example HAMR data storage medium 130 that can be employed in the data storage device 100 of FIG. 1. The medium 130 has a substrate 132, such as glass or silicon, on which one or more underlayer(s) 134 are deposited. The underlayer structure 134 may comprise any number of different layers and materials, such as a heat sink material and a seed material that promotes formation of a magnetic storage layer 136 on top.

In some embodiments, the storage layer 136 contacts a magnetic write layer 138 while other embodiments position an exchange control layer (ECL) 140 between the storage 136 and write 138 layers, as shown by segmented line 142. While the write layer 138 may be exposed to an air bearing, one or more protective layers 144, such as a carbon overcoat, can be positioned atop the write layer 138 to provide an air bearing surface (ABS). It is noted that the lamination of the storage 136, write 138, and exchange control 140 layers can be characterized as an exchange coupled composite (ECC) where the storage 136 and write 138 layers are coupled together.

In heat-assisted magnetic recording (HAMR) media, information is written to the media at elevated temperatures close to the Curie temperature (Tc) of the media. FePt is the major material for HAMR media. A typical FePt material has Tc of around 700 K, meaning that write temperature, (Twr), is approximately 700 K. Such a high temperature can cause reliability issues in a data storage device. On the other hand, it is noted that Tc variation ($\sigma$Tc) is a source of media noise during a data writing process. Therefore, assorted embodiments are directed to a HAMR data storage medium design that has lower Twr and smaller $\sigma$Tc to allow quick and accurate data writing in high data density HAMR environments.

Figure 3:
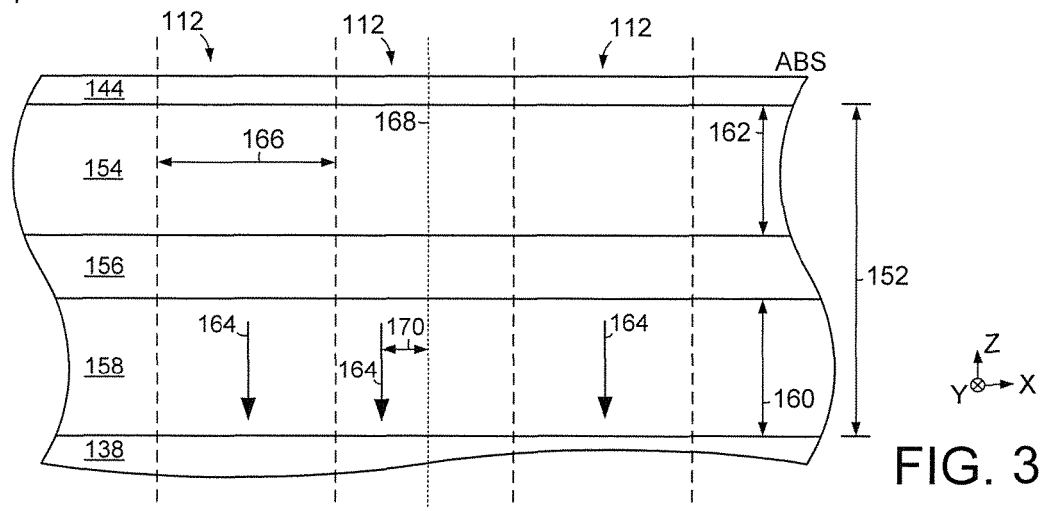
FIG. 3 displays a cross-sectional line representation of a portion of an example HAMR data storage medium that may be employed in the device of FIG. 1.

FIG. 3 shows a cross-sectional line representation of a portion of an example HAMR data storage medium 150 that can be utilized in the data storage device 100 of FIG. 1. FIG. 3 displays an example HAMR ECC structure 152 positioned between a protective layer 144 and an underlayer 134. The HAMR ECC structure 152 is composed of a granular write layer 154 often on the top, an ECL 156 in the middle, and a storage layer 158 often in the bottom. While not limiting, the storage layer can be an FePtX-based material with a very high anisotropy, such as 45-100 kOe, and as Tc of approximately 700 K, such as within a range of 550-750K.

The write layer 154 is an FePtY-based or CoPtZ-based material with relatively lower anisotropy and higher Curie temperature than the storage layer 158. For example, the write layer 154 may have a Tc of approximately 800K, such as within a range of 650-900K. The exchange control layer 156 can be any number of layers and different materials that are exchange-coupled to the write 154 and storage 158 layers at temperatures ranging from room temperature (300 K) to the Tc of the storage layer 158.

The various layers of the HAMR ECC 152 are tuned for material and thickness, along the Z axis, to serve different functions. The storage layer 158 functions as the data storage layer, which is where data bits reside. The storage layer 158 is constructed of a FePt-based material which has very high anisotropy, such as greater than 40 kOe, and therefore has an average grain size of smaller than 8.5 nm, which allows for high areal density recording and high HDD data capacity.

The write layer 154 is tuned to have a higher Tc, such as 800 K or greater, than the storage layer 158 along with a magnetic saturation (Ms) of 500 emu/cc or greater and an Hk of 5 kOe or greater. The tuned structural characteristics of the write layer 154 serves as a major write-assisting layer during a HAMR data writing process. Such tuning can involve creating the thickness 160 of the storage layer 158 to be 8 nm or greater and the thickness 162 of the write layer 154 to be no thinner than 4 nm.

In general, both of the storage layer and write layer can be composed of multiple layers of slightly different materials. The exchange control layer 156 is not restricted to be specific materials, but can be any element or compound that promotes exchange coupling between the write 154 and storage 158 layers. Ideally, the write layer 154 has a zero or low Tc distribution, such as 0.5-3%, but constructing a material with such a low Tc distribution may be vey difficult.

Accordingly, various embodiments select the materials, thicknesses, and coupling strength of the HAMR ECC 152 to reduce the Twr of the HAMR medium 150 while reducing the transition jitter to effectively reduce the sensitivity of Tc distribution in both the write 154 and storage 158 layers. In other words, since constructing an ECL 156 with less than 3% Tc variation is difficult, the HAMR ECC 152 is tuned to minimize transition jitter by controlling coupling strength and data writing temperature, Twr.

It is noted that transition jitter is meant as a transition position fluctuation. Transition jitter may be characterized/averaged over many transitions and is typically dependent on grain size, grain size distribution, switching field distribution, and in the case of HAMR, freezing temperature, and therefore Curie temperature. A position fluctuation may be a deviation of a data bit from a data track center. As shown, the storage layer 158 has a plurality of magnetic polarities 164 positioned in different data tracks 112 that respectively have a track pitch 166 and a track center 168 where a data bit 110 is ideally centered. However, with a data bit 110 comprising a plurality of magnetic grains of the storage layer material, a programmed magnetic polarity 164 can become offset from the track center 168 by a distance 170 while the storage layer 158 cools from being above its Curie temperature during data writing, particularly at a transition between magnetic polarities in adjacent data bits 110.

It is further noted that a material's Curie temperature distribution can contribute to the occurrence and magnitude of data writing jitter. Hence, difficulty in controlling Tc distribution below 3% for materials conducive to the storage layer 158 has prompted the HAMR ECC structure 152 to be configured with a coupling strength that lowers the risk and severity of data writing jitter and transition jitter. It is contemplated that the coupling strength HAMR ECC 152 configuration that mitigates jitter also reduces the data writing temperature to the storage layer 158, which can optimize data writing performance.

Figure 4:
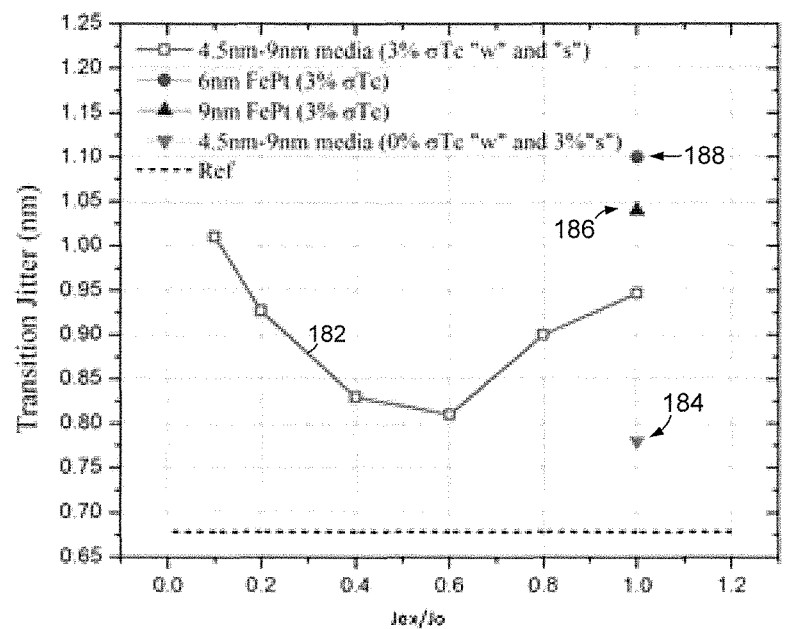
FIG. 4 plots operational data for example HAMR data storage media arranged in accordance with some embodiments.

Turning to FIG. 4 that plots transition jitter for various coupling strengths and Curie temperature distributions. Solid line 182 conveys how transition jitter can be reduced below 0.85 nm by providing a coupling strength of 0.4-0.6 Jex/Jo for a HAMR ECC media with approximately 3% $\sigma$Tc (Tc distribution) for both the write and storage layers. Triangle 184 corresponds with a modeled ECC media with 0% $\sigma$Tc for the write layer and 3% $\sigma$Tc for the storage layer. Triangle 186 represents a single 9 nm thick FePt recording layer with 3% $\sigma$Tc and circle 188 represents a 6 nm thick FePt recording layer with 3% $\sigma$Tc. Thus, interlayer coupling (Jex/Jo) can be tuned to reduce jitter due to Tc variations of the write and storage layers.

Figure 5:
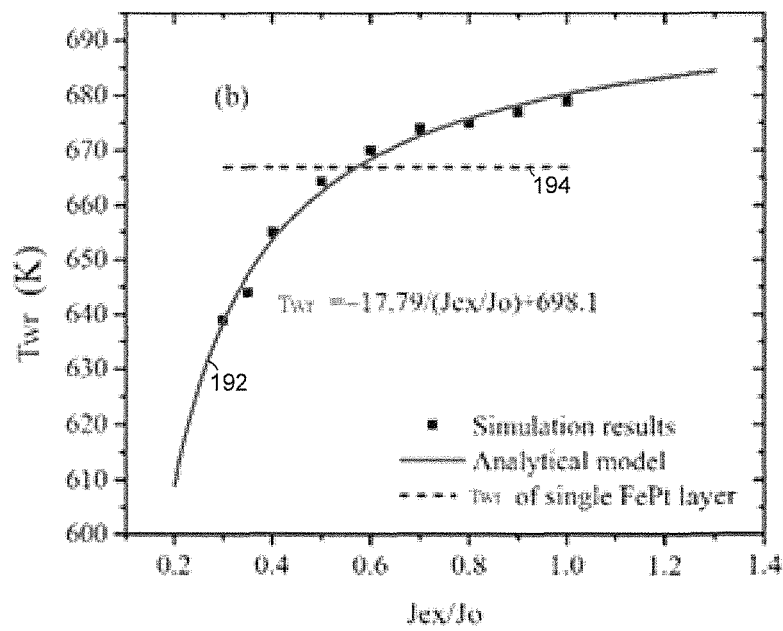
FIG. 5 graphs operational data for example HAMR data storage media utilized configured in accordance with various embodiments.

The data of FIG. 5 illustrates data writing temperatures Twr corresponding to different coupling strengths between the write and storage layers of a HAMR ECC. Solid line 192 is an analytical model of Twr that corresponds with assorted simulation results for various interlayer coupling strengths. Segmented line 194 is a reference that corresponds with a single FePt recording layer. It is noted that the data writing temperature decreases with less interlayer coupling. As such, there is a balancing between reducing data writing jitter and reducing data writing temperature.

FIGS. 6A and 6B respectively display timing diagrams for example HAMR ECC structures. Solid line 202 conveys how a storage layer is heated to a Tpeak in FIG. 6A while a positive magnetic field is applied, as shown by line 204 of FIG. 6B. At a switching temperature for the storage layer, as represented by segmented line 206, the applied magnetic field transitions to a negative polarity before the storage layer completely cools to room temperature (Troom). With the storage layer experiencing both positive and negative polarities between Tpeak and Troom, transition jitter can occur.

The temperature at which a storage layer switches polarity of a data bit is variable. Hence, switching probability (Psw) versus switching temperature (Tsw) is an estimation of transition jitter in real recording situation. A switching probability can be calculated for different storage layer switching temperatures, as shown in FIG. 7 where segmented line 212 conveys switching probabilities for various switching temperatures over time. The Tsw is the temperature at which the applied field direction gets reversed. The Psw is calculated at different Tsw and therefore the Psw-vs-Tsw plot of FIG. 7 is obtained. Twr is the temperature at which dPsw/dTsw has the largest absolute value. A lower value of Twr means that the media can be written at a lower temperature (lower laser power).

FWHM is the full-width-at-half-maximum of the $1^{st}$-order derivative of Erf function used as a fitting function of Psw-vs-Tsw, as illustrated by solid line 214. Smaller FWHM can be translated into smaller transition jitter (noise). Therefore, a HAMR ECC structure, in accordance with some embodiments, has an interlayer exchange coupling that lowers writing temperature and increases switching probability for a magnetic polarity 164 and data bit 110.

Figure 8:
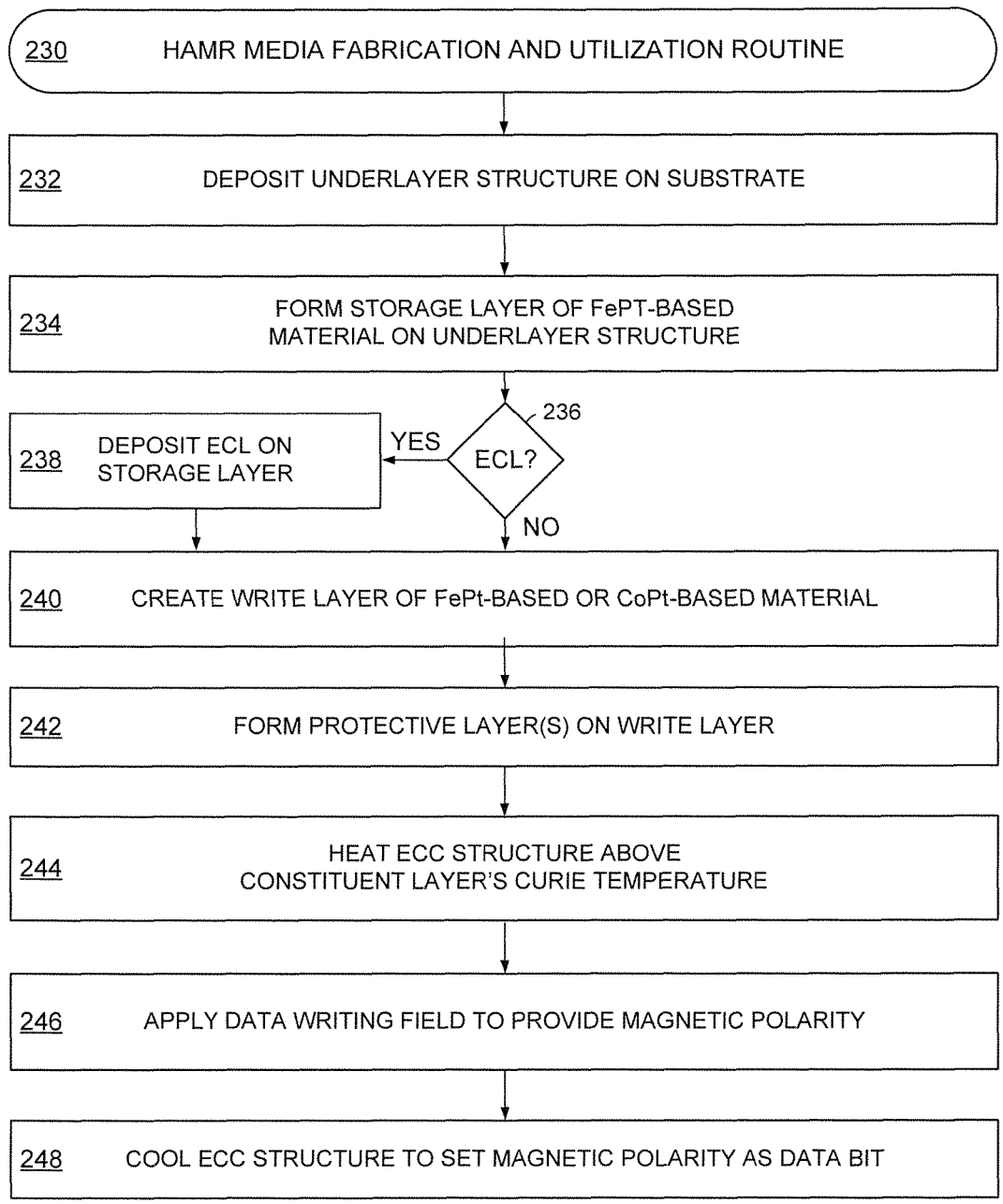
FIG. 8 provides a flowchart for an example writing element fabrication routine that may be carried out in accordance with various embodiments.

FIG. 8 is an example routine 230 for fabricating and utilizing a HAMR media in accordance with various embodiments. It is noted that the various fabrication steps of routine 230 can be altered and moved at will just as additional step and/or decisions can be added. In the example routine 230, an underlayer structure is deposited on a substrate in step 232. The underlayer may consist of one or more layers, materials, and thicknesses that support the structure and operation of a storage layer formed in step 234. The storage layer is a FePtX material where X is C, oxide, nitride, or carbide.

With the storage layer constructed, decision 236 determines if an exchange control layer (ECL) is to be created. If so, step 238 deposits an ECL on the storage layer. If no ECL is chosen, or at the conclusion of step 238, a write layer is created in step 240 of a FePt-based or CoPt-based material. It is contemplated that the storage and write layers are constructed of matching materials with similar, or dissimilar, thicknesses. It is further contemplated that the write layer has a different material composition than the storage layer as well as from the ECL.

The routine 230 proceeds to step 242 where one or more protective layers are formed atop the write layer to establish an air bearing surface for the data storage medium. At the conclusion of step 242, a HAMR ECC data storage medium is complete with a coupling strength and data writing temperature customized to reduce transition jitter and increase switching probability. Subsequent to formation of the HAMR ECC data storage medium, step 244 heats the write and storage layers with a heating means above each layer's Curie temperature. A magnetic field is applied in step 246 to set a magnetic polarity in the storage layer prior to the storage layer cooling in step 248 to set the written magnetic polarity as stable data at room temperature.

Through the various embodiments of this disclosure, it has been demonstrated that by utilizing the ECL layer, vertical coupling between the write and storage layers can be optimized to achieve better performance than with a single data recording layer, even for cases with finite Tc distributions in both the write and storage layers.

The requirement of the ECL layer is that it has to provide enough coupling strength within a temperature range (room temperature to Tc of storage layer). The relative coupling strength can also be tuned by tuning the thickness of ECL or different materials. This tuning of the coupling strength via ECL can help reduce Twr of the media, and the same time lowering transition jitter induced by σTc's of the write and the storage layers. Based on our modeling results (FIGS. 4 & 5), the coupling strength of ECL can be used to lower Twr, mitigate noise generated from σTc's of the write and storage layers, and therefore narrow the full-width-at-half-maximum (FWHM) which is directly related to transition jitter. The detailed definitions of Twr and FWHM are convey in association with FIGS. 6A, 6B, and 7.

As can be seen in FIGS. 4 and 5, with ECL tuning, transition jitter with 3% σTc in the write layer (denoted as "w") and the storage layer (denoted as "s"), can be brought close to the case with 0% σTc in the write layer (see the point at Jex/Jo=0.6). If we want to design a media with lower Twr, we can further reduce coupling strength to, say Jex/Jo=0.4, where a decent jitter and Twr can be obtained. The proposed composite structures reduce the sensitivity of Tc distributions in both write layer and storage layers.

In both the write layer and storage layers, grain decoupling materials X, Y, Z need to be used to achieve optimal microstructure and recording performance, X, Y, Z can be from the materials of C, oxide, Nitride and Carbide, and the combination of multiple materials.

In summary, a heat-assisted magnetic recording (HAMR) media structure with exchange-coupled composite (ECC) layer structure is proposed. The HAMR disk structure may include a FePt:X-based layer as a storage layer and a FePt:Y-based or a CoPt:Z-based magnetic layer with higher Curie temperature as a write layer. The interface between the write layer and the storage layer may be separated by an exchange control layer (ECL). The composite structure can be optimized to reduce jitter for high density data storage by tuning the exchange coupling between the write layer and storage layer. By optimizing the Hk, Tc contrast between the two layers and the vertical coupling between the two layers, lower recording temperature and smaller jitter (hence higher areal density) can be achieved. Both factors are important for the reliability and storage density for HAMR technology.

While the embodiments herein have been directed to data writing, it will be appreciated that the claimed aspects can readily be utilized in any number of other applications, including data readers and solid-state data storage device applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a data storage medium having an exchange coupled composite (ECC) structure comprising a coupling layer (ECL) contacting and disposed between a storage layer and a write layer, the storage layer having a lower Curie temperature and a higher anisotropy than the respective ECL and write layers, the ECL coupling the write layer to the storage layer with a coupling strength from 0.1 Jex/Jo to 0.6 Jex/Jo.

2. The apparatus of claim 1, wherein the coupling strength is tuned with respect to a grain size of the storage layer and a data track width where data bits of the data storage medium are stored.

3. The apparatus of claim 1, wherein a write temperature for the ECC is less than a Curie temperature for the storage layer.

4. The apparatus of claim 1, wherein the write layer comprises an FePt-based or CoPt-based material.

5. The apparatus of claim 1, wherein the write layer comprises FePtY or CoPtZ where Y and Z is chosen from the group of C, an oxide, a nitride, a carbide, and combinations thereof.

6. The apparatus of claim 1, wherein the storage layer has a room temperature anisotropy of greater then 40 kOe.

7. The apparatus of claim 1, wherein the storage layer has a Curie temperature of 550K or more and 750K or less.

8. The apparatus of claim 1, wherein the write layer has a Curie temperature of 650K or more and 1400K or less.

9. The apparatus of claim 1, wherein the write layer has a room temperature magnetic saturation magnetization of 400 emu/cc or more.

10. An apparatus comprising a heat-assisted magnetic recording (HAMR) data storage medium having an exchange coupled composite (ECC) structure comprising a coupling layer (ECL) contacting and disposed between a storage layer and a write layer, the storage layer comprising an FePtX material and the write layer comprising a FePtY or CoPtZ material where X, Y, and Z are chosen from the group of C, an oxide, a nitride, and a carbide, the storage layer having a lower Curie temperature and a higher anisotropy than the respective ECL and write layers, the ECL coupling the write layer to the storage layer with a coupling strength that corresponds with a transition jitter for the ECC of 2 nm or less.

11. The apparatus of claim 10, wherein the write layer has an anisotropy of 10 kOe or more.

12. The apparatus of claim 10, wherein the HAMR data storage medium has a 3% or lower Curie temperature distribution with respect to the storage and write layers.

13. The apparatus of claim 10, wherein the storage layer has a thickness of 4-10 nm.

14. The apparatus of claim 10, wherein the write layer has a thickness of 1-6 nm.

15. The apparatus of claim 10, wherein the HAMR data storage medium has a write temperature of 670 K or more and 690 K or less.

16. The apparatus of claim 10, wherein the ECL comprises a non-magnetic material chosen from the group of: CoX and RuY where X and Y are each one of: Ru, Cr, Ta, and Zr.

17. A method comprising:
forming a storage layer atop a substrate;
depositing an exchange coupling layer in contact with the storage layer;
creating a write layer in contact with the exchange coupling layer, the storage layer having a lower Curie temperature and a higher anisotropy than the respective ECL and write layers, the ECL coupling the write layer to the storage layer with a coupling strength of 0.1-0.6 Jex/Jo; and
applying a data write field to the storage, exchange coupling, and write layers to provide a predetermined magnetic polarity.

18. The method of claim 17, wherein the storage, exchange coupling, and write layers are each magnetic materials.

19. The method of claim 17, wherein the write, exchange coupling, and storage layers are each heated in combination with an applied write field of 5-15 kOe.

20. The method of claim 17, wherein at least one underlayer is positioned between the substrate and the storage layer.

* * * * *